(12) United States Patent
Sakurai et al.

(10) Patent No.: US 6,935,793 B2
(45) Date of Patent: Aug. 30, 2005

(54) MANUFACTURING METHOD OF LIGHT SHIELDING BLADE MATERIAL

(75) Inventors: Ryo Sakurai, Koriyama (JP); Takao Ogawa, Koriyama (JP)

(73) Assignee: Nedec Copal Corporation, Tokyo (JP)

( * ) Notice: Subject to any disclaimer, the term of this patent is extended or adjusted under 35 U.S.C. 154(b) by 0 days.

(21) Appl. No.: 10/394,006

(22) Filed: Mar. 24, 2003

(65) Prior Publication Data

US 2003/0185557 A1 Oct. 2, 2003

(30) Foreign Application Priority Data

Mar. 27, 2002 (JP) ......................................... 2002-087491

(51) Int. Cl.$^7$ ............................. G03B 9/40; G03B 9/10; G03B 9/20; G03B 9/02
(52) U.S. Cl. ....................... 396/488; 396/495; 396/497; 396/505
(58) Field of Search ........................ 396/488, 483–487, 396/449–458, 495, 496, 493, 505–507, 510, 497; 359/234

(56) References Cited

U.S. PATENT DOCUMENTS

| 5,202,715 | A | | 4/1993 | Matsubara |
| 5,283,098 | A | * | 2/1994 | Matsubara ................... 428/113 |
| 5,630,190 | A | * | 5/1997 | Matsubara et al. ......... 396/488 |

FOREIGN PATENT DOCUMENTS

| JP | 62-109032 | 5/1987 |
| JP | 03-228037 | 10/1991 |
| JP | 06-160938 | 6/1994 |
| JP | 10-301158 | 11/1998 |
| JP | 11-194393 | 7/1999 |
| JP | 2000-75353 | 3/2000 |

OTHER PUBLICATIONS

Notice of Rejection dated Dec. 7, 2004 in corresponding Japanese Patent Application No. 2002–087491 filed Dec. 2, 2004.

* cited by examiner

*Primary Examiner*—Judy Nguyen
*Assistant Examiner*—Rochelle Blackman
(74) *Attorney, Agent, or Firm*—Nixon Peabody LLP

(57) ABSTRACT

A light shielding blade material is provided for an optical apparatus and has at least three prepreg sheets each being comprised of an epoxy resin of a thermosetting type as a matrix resin and containing a fiber drawn in an alignment direction within the matrix resin. These prepreg sheets are superposed upon each other so that the alignment directions of the fibers of the prepreg sheets disposed adjacent to each other cross at right angles to each other. The material has also two or more films each being comprised of an epoxy resin of a non-cured state as a base resin and containing 15 to 40 weight % of carbon black in the epoxy resin. These films are disposed to form a laminate of the prepreg sheets and the films so that the prepreg sheets contact one surface or both surfaces of each film. The laminate is applied with pressure and heat to cure the epoxy resin, such that the epoxy resin constituting the base resin of the film is diffused and integrated into the matrix resin of the prepreg sheet so that an interface between the base resin and the matrix resin disappears, and that the carbon black is dispersed from the base resin of the film to the matrix resin of the prepreg sheet.

8 Claims, 5 Drawing Sheets

MANUFACTURING METHOD OF LIGHT SHIELDING BLADE MATERIAL

BACKGROUND OF THE INVENTION

1. Technical Field of the Invention

The present invention relates to a light shielding blade material for an optical apparatus which requires LIGHT shielding properties for use in a shutter blade or diaphragm blade of a focal plane shutter or lens shutter of a camera, and a manufacturing method of the material. For details, the present invention relates to a light shielding blade material formed of a composite resin reinforced by carbon fibers.

2. Related Art

A plate material formed of carbon-fiber reinforced plastics (CFRP) has frequently been used as a shutter blade of a focal plane shutter. The blade constituted of CFRP is light in weight and high in bend rigidity, and has little corrugation of the blade during run and immediately after stop even at a high shutter speed exceeding 1/8000 second. Above all, in the CFRP plate suitable for the high-speed shutter, a carbon fiber aligned as a reinforcing fiber in one direction is used, and an epoxy resin is used as a matrix resin. The CFRP plate material is manufactured by superposing a plurality of prepreg sheets as precursors so that fiber directions cross at right angles to one another, and pressing, heating, and curing the whole laminate plate. The CFRP plate manufactured in this manner is cut in practical shapes of light shielding blades. The blade is generally pressed and punched. The light shielding blade using such CFRP plate is disclosed, for example, in Japanese Patent Application Laid-Open Nos. 6-160938, 10-301158, 11-194393, and 2000-75353.

However, the CFRP plate has a tentative light shielding property because of a black carbon fiber, but to secure a complete light shielding property required for a shutter blade, it is necessary to add carbon black to a matrix resin. A prepreg sheet in which the carbon black is mixed into the matrix resin is a custom-made item, cost is therefore high, and need for production in a larger amount arises. Therefore, a high-cost and large-amount stock is required, and this causes a cost increase of the light shielding blade formed of CFRP.

There has been a demand for a light shielding blade material for an optical apparatus in which a commercially available carbon-black-free prepreg is used without adding the carbon black to a prepreg as a raw material and which has a practical price. One example of the material is disclosed in the Japanese Patent Application Laid-Open No. 10-301158. According to this, in a light shielding blade formed of a carbon-fiber reinforced resin formed by laminating a plurality of reinforced resin sheets comprised of a matrix resin containing carbon fiber aligned in one direction so that fiber directions cross at right angles to one another, a homogeneous resin layer is disposed as an intermediate layer between the reinforced resin sheets. The carbon black is mixed in the resin layer which is the intermediate layer. Concretely, the prepreg sheet of the matrix resin such as the epoxy resin is superposed upon the resin layer of polyurethane in which the carbon black is mixed, and heated/pressurized/molded to obtain a light shielding blade plate material.

However, the material of the matrix resin is different from that of the intermediate resin, and the CFRP plate therefore has a possibility that an interface is peeled or deformed by influences of temperature, and does not necessarily have a stable shape. Moreover, the carbon black mixed in the intermediate resin layer is not dispersed into the prepreg and is confined substantially within the intermediate urethane layer, and therefore unevenness is sometimes generated in the shielding property.

SUMMARY OF THE INVENTION

In consideration of the above-described problem of the related art, an object of the present invention is to provide a light shielding blade material formed of a fiber reinforced resin which is superior in shape stability and shielding uniformity and which is inexpensive. To achieve the object, the following measures have been taken. That is, according to the present invention, there is provided a light shielding blade material for an optical apparatus manufactured by the steps of preparing a prepreg sheet being comprised of an epoxy resin of a thermosetting type as a matrix resin and containing a fiber drawn in an alignment direction within the matrix resin, superposing at least three prepreg sheets upon each other so that the alignment directions of the fibers of the prepreg sheets disposed adjacent to each other cross at right angles to each other, disposing two or more films being comprised of an epoxy resin of a non-cured state as a base resin and containing 15 to 40 weight % of carbon black in the epoxy resin so that the prepreg sheets contact one surface or both surfaces of each film, and applying pressure and heat to a laminate of the prepreg sheets and the films to cure the epoxy resin, such that the epoxy resin constituting the base resin of the film is diffused and integrated into the matrix resin of the prepreg sheet so that an interface between the base resin and the matrix resin disappears, and that the carbon black is dispersed from the base resin of the film to the matrix resin of the prepreg sheet.

Preferably, the prepreg sheet contains a carbon continuous fiber or carbon discontinuous fiber drawn and aligned in one direction. In one mode, the film is formed by coating the prepreg sheet with a solution of an epoxy resin containing the carbon black. In another mode, the base resin containing the carbon black is molded into the film beforehand and superposed upon the prepreg sheet.

According to the present invention, the base resin of the film superposed on the prepreg sheet is mainly formed of the epoxy resin in the same manner as in the matrix resin of the prepreg sheet. The epoxy resin constituting the base resin of the film is diffused and integrated into the epoxy resin constituting the matrix resin of the prepreg sheet, and the interface between the basic resin of the film and the matrix resin of the prepreg sheet disappears. Thereby, a peel in the interface or difference of coefficient of thermal expansion in the interface is eliminated, and the light shielding blade material stable in the shape at ambient temperature is obtained. Moreover, since the carbon black first mixed in the base resin is also dispersed into the matrix resin of the prepreg sheet, a uniform light shielding property can be obtained without any unevenness.

DETAILED DESCRIPTION OF THE INVENTION

Figure 1A:
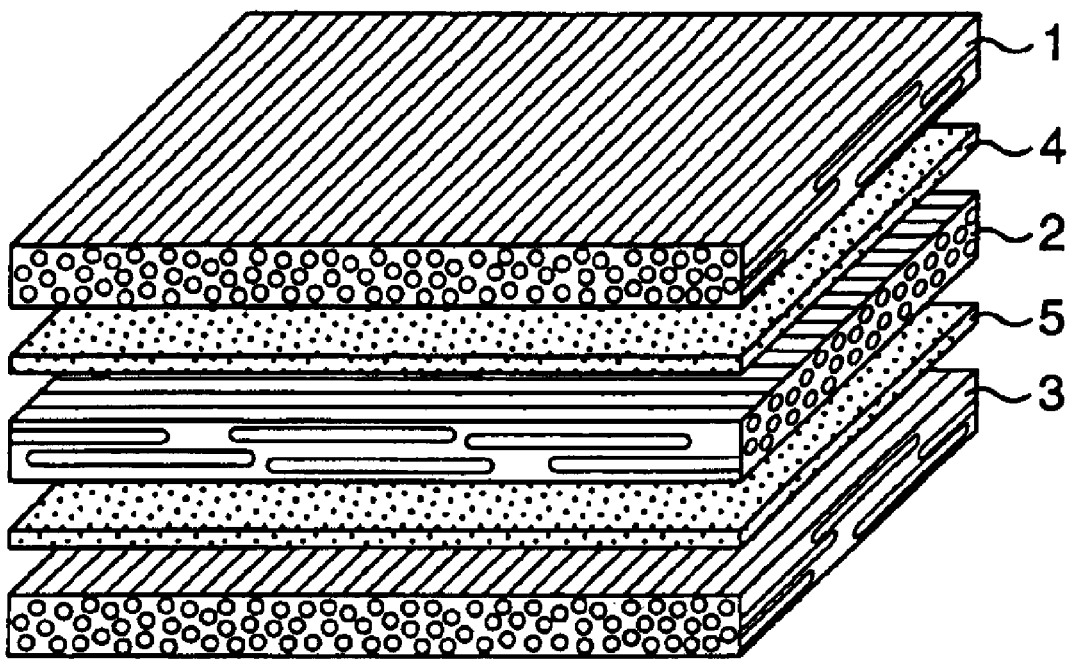
FIGS. 1(A) and 1(B) are a schematic perspective view showing an embodiment of a light shielding blade material according to the present invention and a manufacturing method of the material.
Figure 1B:
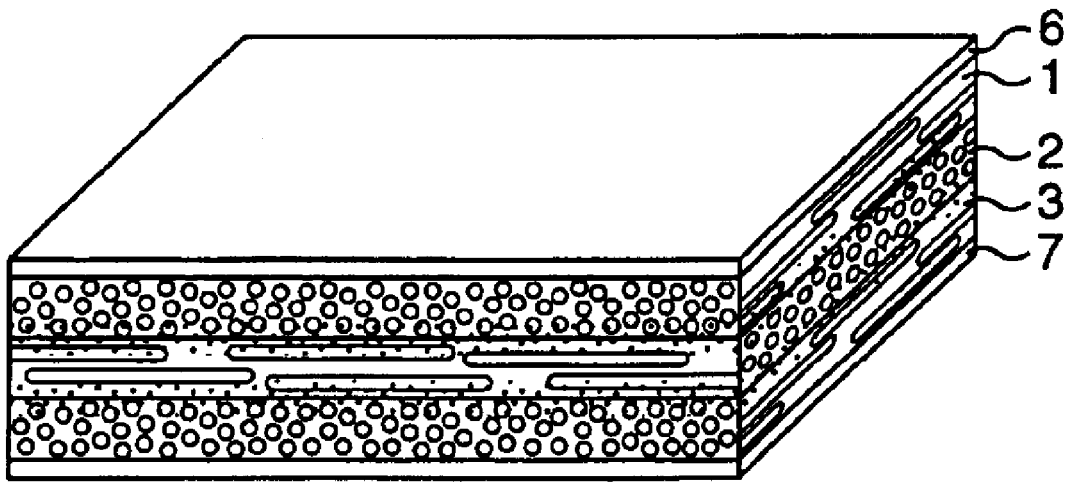

A mode for carrying out the present invention will be described hereinafter in detail with reference to the drawings. FIGS. 1(A) and 1(B) are a schematic diagram showing an embodiment of a light shielding blade plate for an optical apparatus and a manufacturing method of the plate according to the present invention. First, as shown in FIG. 1(A), a prepreg sheet is prepared by a thermosetting epoxy resin as a matrix resin including a fiber drawn and aligned in one direction. Subsequently, at least three prepreg sheets 1, 2, 3 are superposed upon one another so that the aligning directions of fibers disposed adjacent to each other cross at right angles to each other. Thereafter, two or more films 4, 5 containing 15 to 40 weight % of carbon black in the non-cured epoxy resin which is a base resin are disposed so that the prepreg sheets 1, 2, 3 contact opposite surfaces of the film.

As shown in FIG. 1(B), the prepreg sheets 1, 2, 3 are superposed upon the films 4, 5 and pressurized/heated to cure the epoxy resin, so that a light shielding blade material for the optical apparatus is obtained. As shown, in the light shielding blade material, the epoxy resin constituting the base resin of the film is dispersed and integrated into the matrix resin of the prepreg sheets 1, 2, 3, and an interface between both resins disappears. Thereby, a peel along the interface or difference of coefficient of thermal expansion also disappears, and shape stability against a temperature change increases. Moreover, the carbon black in the base resin is also uniformly dispersed into the matrix resin of the prepreg sheets 1, 2, 3. It is to be noted that the carbon black is represented by black dots in the drawing. Thereby, a uniform shielding property is obtained without any unevenness. It is to be noted that for use in shutter blades requiring more complete light shielding and lubricating properties, black lubricating coat films 6, 7 may also be formed on the opposite surfaces of the blade material as shown.

As described above, the light shielding blade material for the optical apparatus according to the present invention is manufactured by: laminating prepregs including the epoxy resin which is the matrix resin containing reinforcing fibers such as a carbon fiber drawn and aligned in a thickness, for example, of about 25 $\mu$m so that aligning directions of the fibers cross at right angles to one another like 0°/90°/0°; and heating and curing the prepreg. At this time, different from the shielding film of conventional material as in the related art, for the film inserted between prepreg sheets, a material is used containing 15 to 40 weight % of carbon black in the epoxy resin compatible to the matrix resin, which is a base resin. Depending on the circumstances, a material containing a melamine resin in addition to the epoxy resin may also be used as the base resin. It is to be noted that the content of carbon black is preferably 15% or more in order to obtain a practical shielding property. However, when the content of the carbon black exceeds 40 weight %, it is sometimes difficult to uniformly disperse the carbon black in a final product state.

Concretely, the surface of the prepreg is coated with a resin solution containing 15 to 40 weight % of carbon black in the epoxy resin or epoxy melamine resin which is the base resin, so that the film can be formed. Alternatively, a carbon-black-containing epoxy composition coated on a release sheet is transferred to the surface of the prepreg, so that a semi-cured resin film having a B stage state is formed in about 2 to 10 $\mu$m on the surface of the prepreg. When a laminate structure of the films and prepreg sheets is heated/pressurized by a hot press, it is possible to obtain a carbon-fiber reinforced composite resin blade material superior in the shielding property. In the laminated blade material, the film is not physically separated, and is formed integrally with the prepreg sheet. That is, the epoxy resin to which the carbon black is first added is also diffused among the carbon fibers, and a satisfactory light shielding property is obtained. It is to be noted that with the use of an intermediate film made of a material different from that of the prepreg sheet, adhesion to the epoxy resin constituting the prepreg is deteriorated, and there is a possibility of interlayer peel. However, in the present invention, the same resin or the resin of the same base is used. Moreover, during the heating/curing process, a resin composition can mutually be integrated with the matrix resin of the prepreg sheet, and the carbon black is diffused among the carbon fibers. Therefore, it is possible to obtain substantially the same material property as that of a related-art expensive material in which the carbon black is initially added to the prepreg.

Individual materials of the prepreg sheet and film, and manufacturing process parameters will be described hereinafter in detail. First the prepreg sheet has a structure in which a continuous reinforcing structure including carbon continuous fiber strings aligned along a predetermined direction is fixed by the matrix resin. Examples of a method of aligning carbon continuous fibers along one direction includes a method of guiding a bunch of carbon continuous fibers in one direction and densely laying/arranging the fibers along a plane. The prepreg is processed by a wet method of impregnating the densely laid/arranged carbon continuous fibers with the matrix resin, and the prepreg sheet is prepared. One prepreg sheet has a thickness of 25 to 50 $\mu$m, and a meshing amount of the carbon fiber is about 20 g/m².

The prepreg sheet reinforced by carbon discontinuous fibers instead of the carbon continuous fibers can also be used. One surface of a sheet material in which the carbon discontinuous fibers are aligned in one direction is fused/impregnated with an epoxy resin film which is the matrix resin to prepare the prepreg sheet. The carbon fiber is a conventional fiber made by heating and carbonizing organic fibers such as polyacrylonitrile in a nitrogen air flow at 700 to 1800° C. and which has a high strength and elasticity. The carbon discontinuous fiber is prepared by cutting the carbon fiber, and has an outer diameter, for example, of about 7 $\mu$m, and a length of 3 to 20 mm. As compared with the continuous fiber, it is possible to substantially uniformly disperse the discontinuous fibers over the whole area of the prepreg sheet, and a local inner stress is small in the structure.

Next, for example, the epoxy resin is used as the base of the film, and the carbon black is dispersed in the base by 15 to 40 weight %. The carbon black preferably has an average particle diameter of 0.01 $\mu$m or less. A composition in which the carbon black is mixed in the epoxy resin can be shaped into a uniform film having a thickness of 2 to 10 $\mu$m, for example, on the release sheet. The film is easily released from the release sheet even at a relatively low temperature, and can be transferred onto the prepreg sheet. After transferring the film and laminating the prepreg sheets, the laminate structure is set in a hot press machine, and pressurized/heated/molded at a temperature of about 130° C. for several hours with a pressure of 10 kg/cm$^2$, and the non-cured thermosetting epoxy resin is bridged, reinforced and hardened. As a result, the film transferred beforehand is completely united with the prepreg sheet, and a boundary between the film and the sheet disappears.

The surface of the light shielding blade material molded in this manner is sometimes coated with a black coat film in accordance with a purpose. For example, this coat film is constituted of a resin selected from acrylic, epoxy, and diallyl phthalate-based resins to which the carbon black and PTFE having a lubricating property are added. Moreover, an amount of carbon black in the coat film is set to a range of 5 to 17 weight %. Additionally, the amount of PTFE in the coat film is in a range of 4 to 10 weight %, and imparts lubricating frictional damage resistance to the surface of the coat film.

Examples will be described hereinafter. Example 1 has a layer constitution shown in FIGS. 1(A) and 1(B) constituted by: laminating a prepreg sheet including carbon continuous fibers drawn and aligned in one direction and the epoxy resin as the matrix resin and having a thickness of 25 µm and a semi-cured resin film containing 25 weight % of carbon black added to the epoxy resin and having a thickness of about 10 µm in the B stage state in an order of FIG. 1 (A); and heating/pressurizing/molding the sheets and films. As a result, the blade material having a thickness of 85 µm was obtained. The shielding property of the blade material was satisfactory. The lubricating black coat film was formed in a thickness of 5 µm on the opposite surfaces of the blade material, and assembled into a focal plane shutter. Although durability tests were conducted 200 thousand frequencies, disadvantages such as breakage were not generated, and drop in the light shielding property was not observed.

Figure 2A:
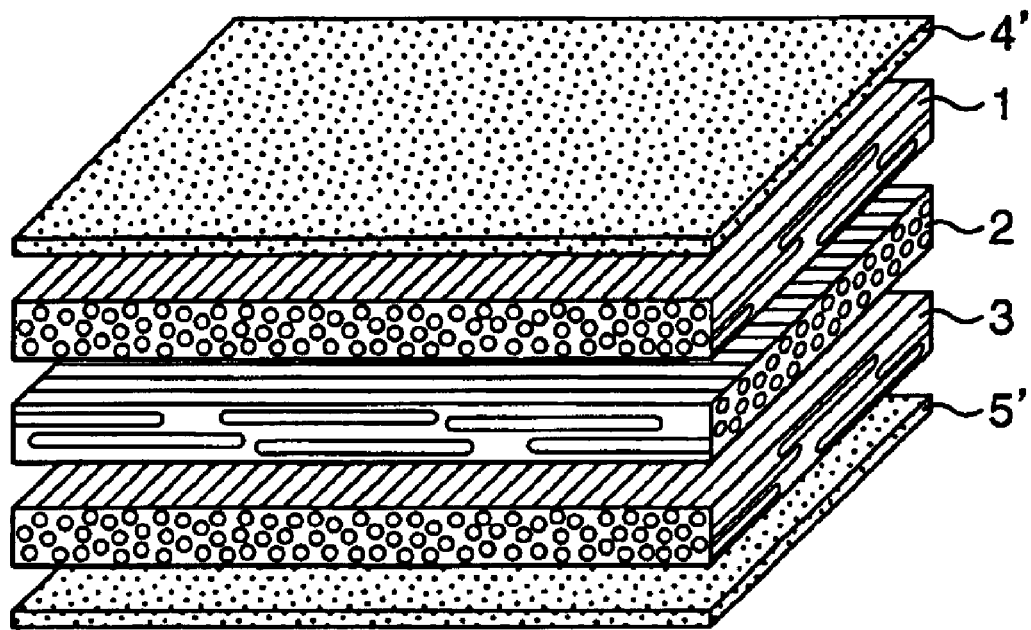
FIGS. 2(A) and 2(B) are a schematic perspective view showing another embodiment of the light shielding blade material and manufacturing method according to the present invention.
Figure 2B:
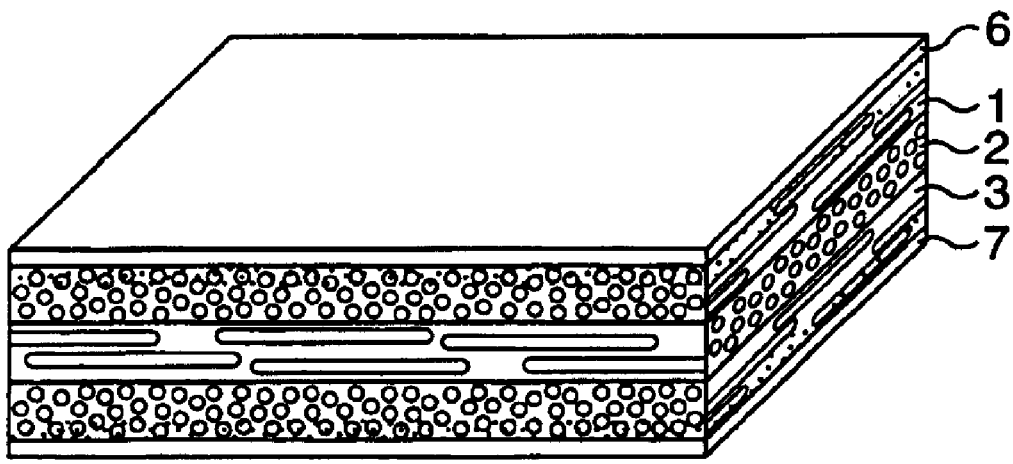

Example 2 has a constitution of FIGS. 2(A) and 2(B). For ease of understanding, portions corresponding to those of the above-described example shown in FIGS. 1(A) and 1(B) are denoted with the same reference numerals. The same prepreg sheet and film as those of Example 1 were used. As shown in FIG. 2(A), three prepreg sheets 1, 2, 3 are superposed upon one another so that the aligning directions of the fibers cross at right angles to one another, and epoxy films 4', 5' to which the carbon black is added are superposed upon the opposite surfaces of the laminate. This laminate material was heated/pressurized/molded to obtain a blade material having a thickness of 85 µm. The light shielding property of the blade material is satisfactory. As shown in FIG. 2(B), black lubricating coat films 6, 7 were formed in each thickness of 5 µm on the opposite surfaces of the blade material, and punched/processed in the shape of a shutter blade. This shutter blade was assembled into the focal plane shutter, and the durability tests were conducted 200 thousand cycles, but the defects such as breakage were not generated, and any drop in the light shielding property was not seen. Particularly, when the film is disposed on the surface of the prepreg sheet, and even when the surface is collapsed by repeated shutter operations, the carbon black exists in gaps among the carbon fibers, and therefore the light shielding property is not lost by friction.

Figure 3A:
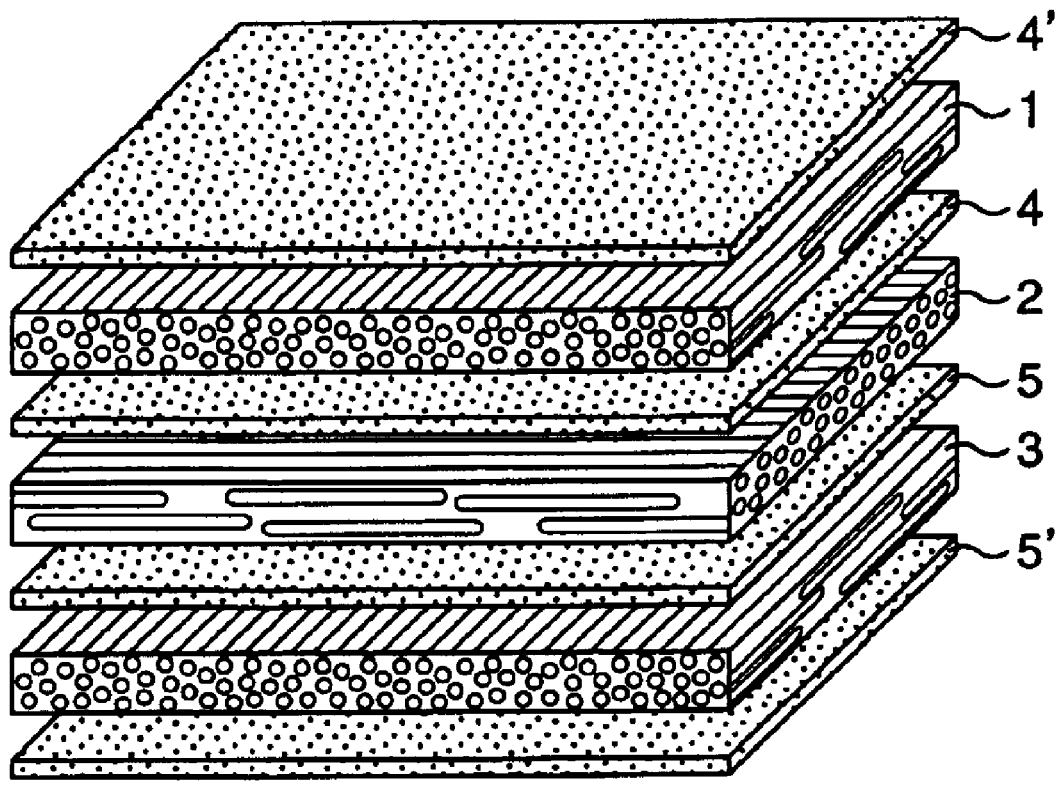
FIGS. 3(A) and 3(B) are a schematic perspective view showing still another embodiment.
Figure 3B:
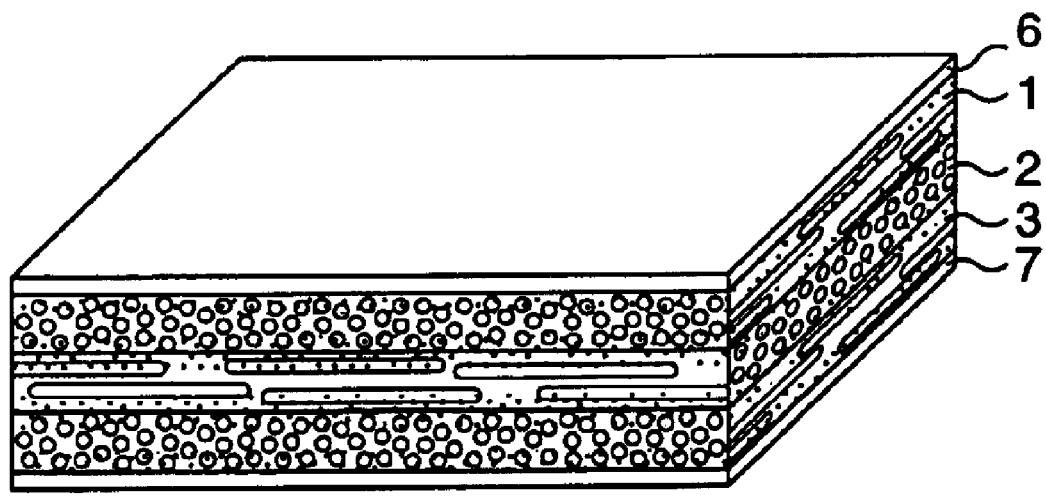

Example 3 has a constitution shown in FIGS. 3(A) and 3(B). As shown in FIG. 3(A), Example 3 is a combination of Examples 1 and 2 described above. That is, two films 4, 5 are disposed among the respective prepreg sheets 1, 2, 3, and further the films 4', 5' to which the carbon black is added are also disposed on the surfaces of the outer prepreg sheets 1, 3. Such laminate structure was heated/pressurized/molded to obtain the blade material having a thickness of 95 µm. The light shielding property of the blade material is satisfactory. The black lubricating coat films 6, 7 were formed on the opposite surfaces of the blade material, and assembled into the focal plane shutter, and the durability tests were conducted 200 thousand cycles, but the disadvantages such as breakage were not generated, and any drop in the light shielding property was not seen. Moreover, the surface was scraped by about 20 µm with a paper file so as to completely remove the black lubricating coat film 6 on one surface, and the light shielding property was confirmed, but there was not any specific problem.

Figure 4:
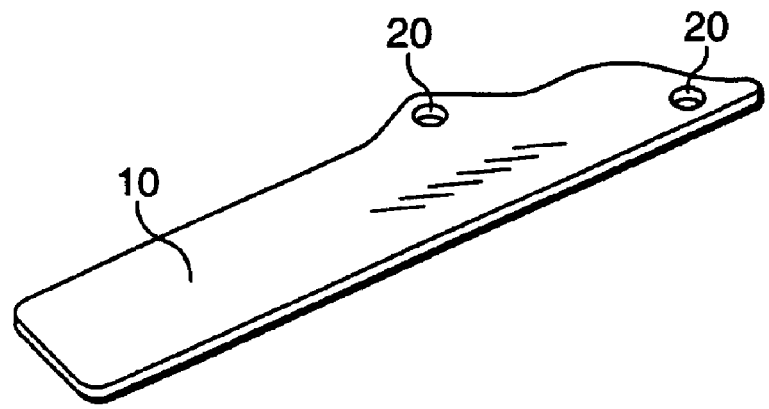
FIG. 4 is a perspective view showing a focal plane shutter blade made of the light shielding blade material according to the present invention.

FIG. 4 shows one example of a focal plane shutter blade obtained by pressing/punching/processing the light shielding blade material shown in FIG. 3(B). A shutter blade 10 has a substantially longitudinal shape, and a pair of connection holes 20 for fixing are formed in one end.

Figure 5:
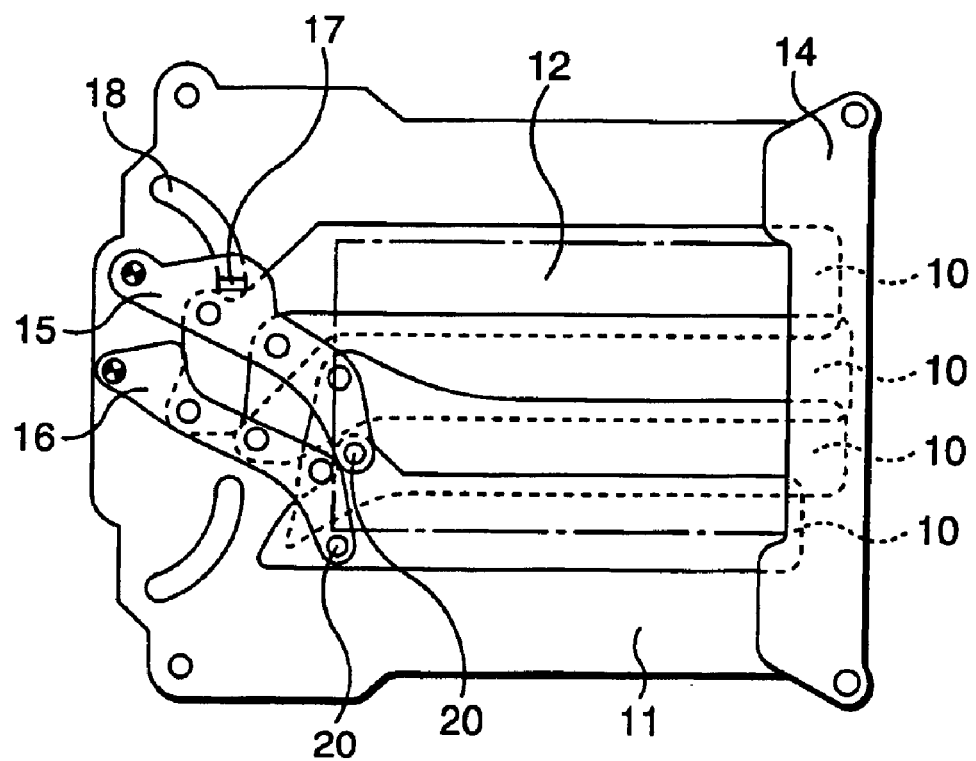
FIG. 5 is a schematic plan view showing a shutter assembled using the focal plane shutter blade shown in FIG. 4.

FIG. 5 shows an example in which the focal plane shutter blade shown in FIG. 4 is assembled in the focal plane shutter. A rectangular opening 12 (shown by one-dot chain line) is disposed in a middle portion of a shutter substrate 11. In a stationary state, four font blades 10 partially overlap one another to shield the shutter opening 12. As not shown, a rear blade group is overlapped and disposed below a front blade group. Unnecessary movement of the tip end of each shutter blade is restricted by a blade press 14. One set of arms 15 and 16 are axially supported in the left end of the substrate 11 so that the arms keep a parallel relation and can freely rotate. Each front blade 10 is engaged with one set of arms 15 and 16 in the tip end. The rear blade group is also similarly engaged by one pair of arms (not shown). An elongated hole 17 is disposed in the main arm 15. An elongated groove 18 is disposed along a movement track of the elongated hole 17 with the rotation of the main arm 15 in the substrate 11. It is to be noted that, as not shown, the elongated hole 17 is engaged with a driving pin passed through the substrate 11 via the elongated groove 18. When a shutter release button (not shown) is pressed, the driving pin moves upwards by an urging force given along the elongated groove 18 disposed in the substrate 11. Accordingly, the main arm 15 engaged with the driving pin in the elongated hole 17 and the connected sub arm 16 rotate upwards. By this rotation, the front blade 10 vertically runs upwards and opens the opening 12. Subsequently, the rear blade group (not shown) vertically runs to block the opening 12 so that exposure operation ends.

Figure 6:
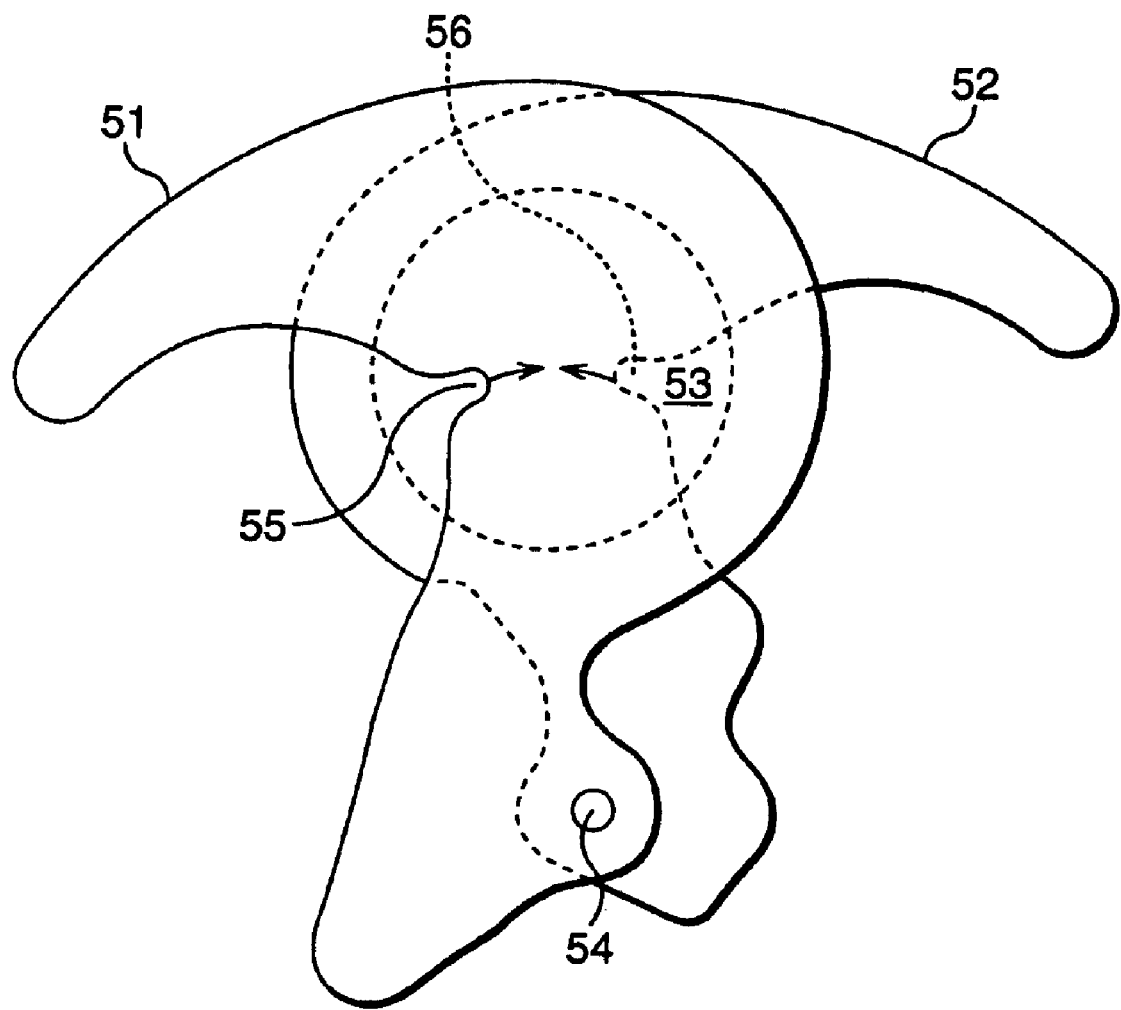
FIG. 6 is a plan view showing a lens shutter blade made of the light shielding blade material according to the present invention.

FIG. 6 shows the shape of a lens shutter blade prepared using the light shielding blade material shown in FIG. 1(A). As shown, a pair of shutter blades 51, 52 are disposed to cover an opening 53. Each shutter blade is axially supported so as to be rotatable centering on a support 54 distant from the center of the opening by a predetermined distance. One pair of shutter blades 51, 52 are driven by driving means (not shown), and run in opposite directions to open/close the opening 53. In a shown state, the opening 53 is in a completely closed state. One shutter blade 51 rotates in a clockwise direction from this state, and the other shutter blade 52 rotates in a counterclockwise direction. At this time, first, concave portions 55, 56 referred to as teardrops overlap and start opening from a middle portion of the opening 53. At this time, when the shutter blades 51, 52 stop running, a so-called small diaphragm state is obtained. The teardrops 55, 56 are disposed so that an error of the small diaphragm state is reduced even with a fluctuation of a rotation angle of the shutter blade.

As described above, according to the present invention, a prepreg sheet which is reinforced by carbon fibers and which includes an epoxy resin as a matrix resin is superposed upon a film which contains carbon black in the epoxy resin, and heated/pressurized/molded to obtain a light shielding blade material. The epoxy resin constituting a base resin of the film is diffused and integrated into the matrix resin of the prepreg sheet so that an interface between both resins disappears, and the carbon black in the base resin is also uniformly dispersed into the matrix resin of the prepreg sheet. Thereby, a light shielding blade material is obtained which is superior in durability and shape stability and which has a uniform light shielding property with low cost.

What is claimed is:

1. A manufacturing method of a light shielding blade material for use in an optical apparatus, comprising the steps of:
   preparing a prepreg sheet being comprised of an epoxy resin of a thermosetting type as a matrix resin and containing a fiber drawn in an alignment direction within the matrix resin, initially no carbon black being added to the matrix resin;
   superposing at least three prepreg sheets upon each other so that the alignment directions of the fibers of the prepeg sheets disposed adjacent to each other cross at right angles to each other;
   disposing two or more films being comprised of an epoxy resin of a non-cured state as a base resin and containing greater than 15 weight % but less than or equal to 40 weight % of carbon black in the epoxy resin so that the prepreg sheets contact one surface or both surfaces of each film, the base resin of the film having a compatibility to the matrix resin of the prepreg sheet; and
   applying pressure and heat to a laminate of the prepreg sheets and the films to cure the epoxy resin, such that the epoxy resin constituting the base resin of the film is diffused and integrated into the matrix resin of the prepreg sheet so that an interface between the base resin and the matrix resin disappears due to the compatibility of the resins, and that the carbon black is dispersed from the base resin of the film to the matrix resin of the prepreg sheet, whereby the carbon black is finally added to the matrix resin.

2. The manufacturing method of the light shielding blade material for the optical apparatus according to claim 1, wherein the prepreg sheet contains the fiber in the form of either a carbon continuous fiber or a carbon discontinuous fiber.

3. The manufacturing method of the light shielding blade material for the optical apparatus according to claim 1, wherein the step of disposing the film comprises coating a surface of the prepreg sheet with a solution of the epoxy resin containing the carbon black to form the film.

4. The manufacturing method of the light shielding blade material for the optical apparatus according to claim 1, wherein the step of disposing the film comprises provisionally molding the base resin containing the carbon black into the film, and superposing the film upon the prepreg sheet.

5. The manufacturing method defined in claim 1, wherein the base resin and the matrix resin are substantially the same resin.

6. A light shielding blade material for an optical apparatus, comprising:
   at least three prepreg sheets each being comprised of an epoxy resin of a thermosetting type as a matrix resin and containing a fiber drawn in an alignment direction within the matrix resin, these prepreg sheets being superposed upon each other so that the alignment directions of the fibers of the prepreg sheets disposed adjacent to each other cross at right angles to each other, no black carbon initially being added to the matrix resin; and
   two or mere films each being comprised of an epoxy resin of a non-cured state as a base resin and containing greater than 15 weight % but less than or equal to 40 weight % of carbon black in the epoxy resin, those films being disposed to form a laminate of the prepreg sheets and the films so that the prepreg sheets contact one surface or both surfaces of each film, the base resin of the film having a compatibility to the matrix resin of the prepreg sheet, wherein
   the laminate is applied with pressure and heat to cure the epoxy resin, such that the epoxy resin constituting the base resin of the film is diffused and integrated into the matrix resin of the prepreg sheet that an interface between the base resin and the matrix resin disappears due to the compatibility of the resins, and that the carbon black is dispersed from the base resin of the film to the matrix resin of the prepreg sheet, whereby the carbon black is finally added to the matrix resin.

7. The light shielding blade material for the optical apparatus according to claim 6, wherein the prepreg sheet contains the fiber in the form of either a carbon continuous fiber or a carbon discontinuous fiber.

8. The light shielding blade material defined in claim 6, wherein the base resin and the prepreg resin are substantially the same resin.

* * * * *